United States Patent
Mock et al.

(10) Patent No.: US 7,639,131 B2
(45) Date of Patent: Dec. 29, 2009

(54) TRACKING DEVICE THAT CONSERVES POWER USING A SLEEP MODE WHEN PROXIMATE TO AN ANCHOR BEACON

(75) Inventors: Von A. Mock, Boynton Beach, FL (US); Eric T. Eaton, Lake Worth, FL (US); David J. Hayes, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 373 days.

(21) Appl. No.: 11/612,441

(22) Filed: Dec. 18, 2006

(65) Prior Publication Data

US 2008/0143604 A1    Jun. 19, 2008

(51) Int. Cl.
    *G08B 1/08* (2006.01)
(52) U.S. Cl. .............. 340/539.3; 340/539.11; 340/539.13
(58) Field of Classification Search .......... 340/572.1, 340/572.4, 573.1, 573.4, 539.1, 539.11, 539.13, 340/539.21, 539.3, 10.1; 235/375
    See application file for complete search history.

(56) References Cited

U.S. PATENT DOCUMENTS

| | | | |
|---|---|---|---|
| 5,963,130 | A | 10/1999 | Schlager et al. |
| 6,169,497 | B1 | 1/2001 | Robert |
| 6,198,390 | B1 * | 3/2001 | Schlager et al. ............. 340/540 |
| 6,362,778 | B2 | 3/2002 | Neher |
| 6,529,164 | B1 | 3/2003 | Carter |
| 6,967,576 | B2 | 11/2005 | Hayes et al. |
| 7,098,786 | B2 | 8/2006 | Dvorak et al. |
| 7,423,535 | B2 * | 9/2008 | Chung et al. ............. 340/572.4 |
| 2002/0014978 | A1 | 2/2002 | Flick |
| 2002/0021231 | A1 | 2/2002 | Schlager et al. |
| 2002/0153996 | A1 | 10/2002 | Chan et al. |
| 2004/0145520 | A1 | 7/2004 | Richardson et al. |
| 2004/0156326 | A1 | 8/2004 | Chithambaram |
| 2004/0189477 | A1 | 9/2004 | Hisano |
| 2005/0068169 | A1 | 3/2005 | Copley et al. |
| 2005/0240959 | A1 | 10/2005 | Kuhn et al. |
| 2006/0056336 | A1 * | 3/2006 | Dacosta ...................... 370/328 |
| 2006/0067286 | A1 | 3/2006 | Cornett |
| 2006/0290519 | A1 * | 12/2006 | Boate et al. .............. 340/573.4 |
| 2007/0023496 | A1 * | 2/2007 | Hall ........................... 235/375 |
| 2007/0159301 | A1 * | 7/2007 | Hirt et al. .................. 340/10.1 |

FOREIGN PATENT DOCUMENTS

EP    1441235 A    7/2004

OTHER PUBLICATIONS

Murray B et al, "Location Tracking System with Hand-Off Capabilities", Motorola Technical Developments, May 1, 1996, pp. 168-173, Schumburg, IL, US.

* cited by examiner

*Primary Examiner*—Van T. Trieu
(74) *Attorney, Agent, or Firm*—Patents On Demand, PA; Brian K. Buchheit; Scott M. Garrett

(57) ABSTRACT

A method for tracking objects in a way that conserves power resources. The method can establish a designed range defining a safe area based upon the broadcast signal of an anchor beacon. When the tracking device is within the designed range, the tracking device can be placed in a mode of low power consumption. Should the tracking device move outside of the designated range, then the tracking device can be placed in mode for active tracking. The level of power consumption can be achieved by only enabling a WAN transceiver in the active tracking mode.

17 Claims, 3 Drawing Sheets

TRACKING DEVICE THAT CONSERVES POWER USING A SLEEP MODE WHEN PROXIMATE TO AN ANCHOR BEACON

BACKGROUND

1. Field of the Invention

The present invention relates to mobile telecommunications and, more particularly, to a tracking device that conserves power using a sleep mode when proximate to an anchor beacon.

2. Description of the Related Art

The ability to use electronic tracking and/or location determination devices is becoming a popular means to automatically determine the location of designated objects. For example, it is becoming a standard feature for mobile telephones to be equipped with Global Positioning System (GPS) components, which permit precise location determinations for emergency 911 calls. This feature also allows associated functions to be added to a mobile device, such as a GPS navigational capability. This type of electronic tracking is also often used in shipping systems to track packages and in the automotive industry to provide anti-theft and protection services.

In addition to locating objects, this technology is used in a number of geo fencing solutions to establish permitted geographical zones. For example, a mobile telephone that includes GPS components and a geo fencing feature can be configured by a family member, such as a parent, to establish permitted zones for school, work, friends' houses, malls, and the like, for the carrier of the mobile telephone. Notifications can be automatically sent to the parent's mobile telephone when a monitored family member, such as a child, enters or leaves any of the established zones. Notifications can also be issued when a mobile telephone travels over an established speed, which presumably indicates a child or teen is traveling in a vehicle at excessive speeds.

Power consumption is a key problem for existing electronic tracking systems. These systems require an extensive amount of power resources in order to provide communications over a Wide Area Network (WAN) and to continuously determine an object's location. For some devices that have access to a substantial power source, such as a mobile telephone, the issue of power consumption is more of an annoyance and detriment than a show-stopping occurrence. In other potential implementations, however, excessive power consumption can result in bulky devices that are too large to serve their intended purpose in an efficient manner. For instance, pet tracking devices are generally not available, since such a device needs to be small enough for a pet to carry (e.g., within a pet collar) yet include enough power reserves to have a reasonable maintenance schedule (e.g., replacing/recharging the battery on a monthly basis).

SUMMARY OF THE INVENTION

The present invention discloses a solution for conserving power resources of a tracking device by placing the device in an active state only when the device is within a designated range of an anchor beacon. When within the designated range of the anchor beacon, the tracking device can be placed in a sleep mode, utilizing a Personal Area Network (PAN) transceiver drawing a nominal amount of power. When outside this range, a WAN transceiver can be activated along with a location determination component. The location of the tracking device can be conveyed to a tracking server. The tracking server can generate a notice when the tracking device is outside of the designated range, which can be conveyed to a previously designated computing device. The tracking server can optionally determine if the tracking device is proximate to a mobile device that has been previously defined as safe when determining whether a notice should be generated; proximity to the safe mobile device representing a safe region. For example, a pet being tracked with the tracking device can be safe when proximate to an owner's mobile telephone (e.g., a safe device), which can indicate that the pet is outside the designated range of the anchor beacon because the owner is walking the pet. In one example, this can be an allowed occurrence and no notice will be generated and sent to the notification device.

In one embodiment, the designated range can be established based upon a quality of a signal that a tracking device receives. The quality of a signal can be determined by any of many means known to those in the art. Examples include received signal strength, packet error rates, bit error rates, etc. Different signal quality thresholds can be established that, are specific to a tracking device and used to adjust a region of permitted mobility on a device by device basis. Hence, different tracking devices receiving signals from a common anchor beacon can each have a device specific designated range. Any device leaving an associated designated range can cause the leaving device to wake from a sleep mode and to convey location identification information to the tracking server.

The present invention can be implemented in accordance with numerous aspects consistent with the material presented herein. For example, one aspect of the present invention can include a method for tracking objects in a way that conserves power resources. The method can establish a designated range based upon a broadcast signal generated by an anchor beacon. When the tracking device is within the designated range, the tracking device can be placed in a mode of low power consumption. Should the tracking device move outside of the designated range, then the tracking device can be placed in a mode for active tracking. The level of power consumption can be achieved by only enabling a WAN transceiver in the active tracking mode.

Another aspect of the present invention can include a method to track a designated object. The method can automatically sense when a tracking device is within a designated range of an anchor beacon. When it is determined that the tracking device is within this designated range, the power state of the tracking device can be changed by activating a WAN transceiver and a location detector. After the change in power state, the location of the tracking device can be determined by the location detector. A notification, including the determined device location, can be wirelessly conveyed to a predetermined computing device.

Still another aspect of the present invention can include a power conserving tracking system that includes at least one anchor beacon and a tracking device. The tracking device can include a sensor for detecting the anchor beacon signal, a location detector, a WAN transceiver, and a power source with multiple power modes. When the tracking device is within a designated range of an anchor beacon determined by signal quality, the power source can be automatically placed in a low power mode. The tracking device can be automatically placed in an active power mode when the tracking device moves outside of the designated range. In the active power mode, the WAN transceiver and location detector can be activated to repeatedly determine the location of the tracking device and to convey the location to a computing device.

Another aspect of this invention is for one or more mobile communication devices to selectively receive notifications based upon whether a tracked object (e.g., PET) is within a designated range of one or more anchor beacons and/or whether a tracked object is proximate to one or more safe mobile devices, in a first instance, the object tacking device can send a notification to a tracking server when it is no longer in the designated range of an anchor beacon. The tracking server can then determine if the object tracking device is collocated or proximately located with one or more of the sate mobile devices. When the object tracking device is outside the designated range and not collocated with a safe device, a notification can be automatically conveyed to an object caretaker's device.

Another aspect of this invention is for an object tracking device to send a notice to a tracking server when it is no longer in a designated range of an anchor beacon, which can be a fixed and/or a movable (e.g., a user's mobile device can function as a safe mobile device or an anchor beacon in one embodiment) beacon. A mobile device functioning as an anchor beacon, may or may not include local geo fencing capabilities. When no local geo fencing capabilities are present, the tracking server can compensate by repetitively determining a location of the mobile device in relationship to the object tracking device.

When the object tracking device is outside the designated range of an anchor beacon, the tracking server can determine if the object tracking device is still within a geo fence and can provide control commands to the tracking device. Further, a notification can be sent to one or more mobile communication devices based upon a location of the object tracking device in relation to the geo fence. For example, when an object tracking device is within the geo fence, the tracking server will not notify one or more mobile communication users, but may choose to alter a tracking device location measurement interval by sending an Over The Air (OTA) command. An OTA command is one that is wirelessly conveyed via a wireless communication network. A notification to one or more mobile communication devices can be automatically sent when the object tracking device is no longer inside the geo fence. Further, the object tracking device's location measurement interval can be decreased to give more frequent location updates through an OTA command sent to the object tracking device.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
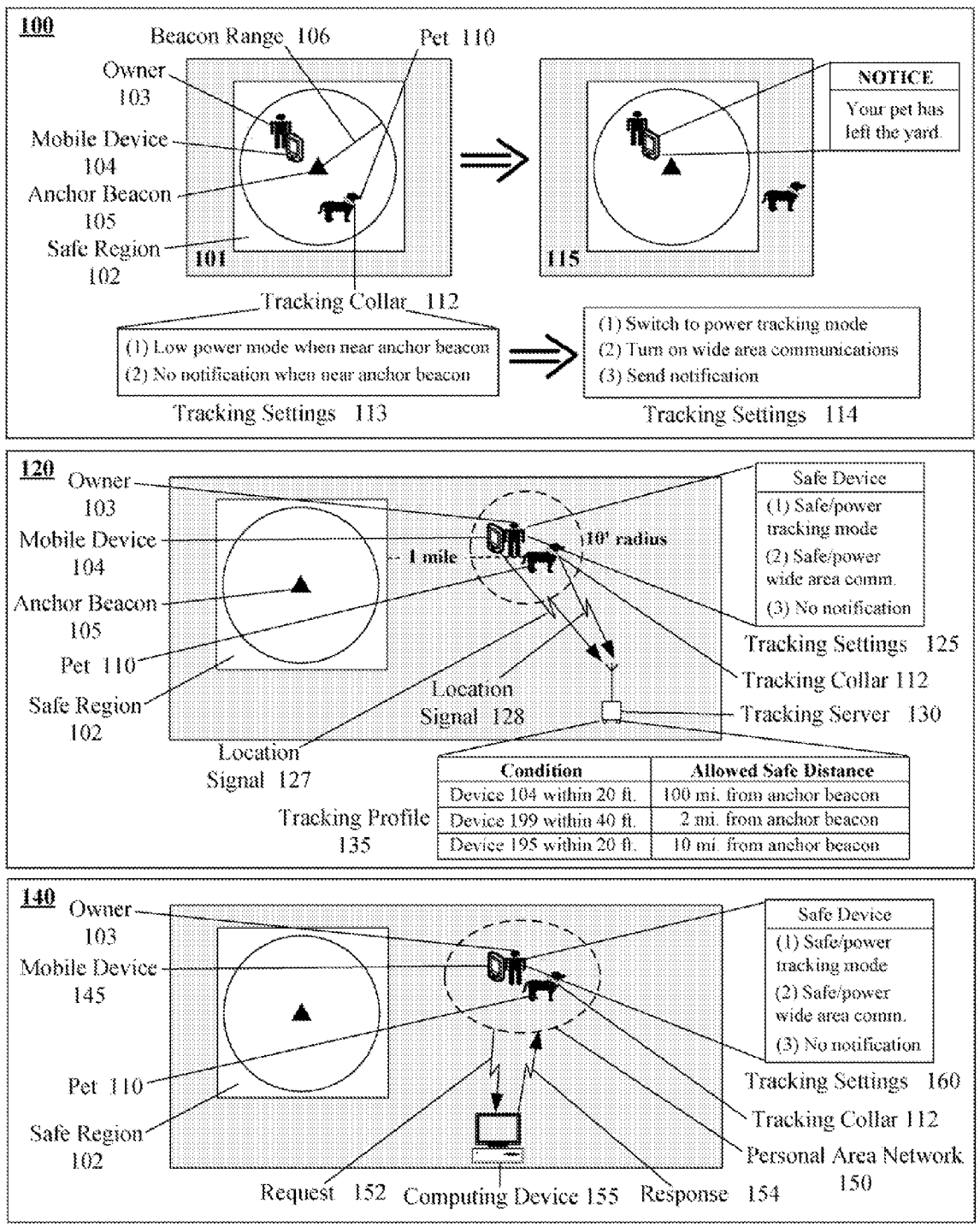
FIG. 1 is a set of diagrams that illustrate how a proximity of a tracking device to defined safe devices automatically adjusts the power mode of the tracking device in accordance with the inventive arrangements disclosed herein.

FIG. 1 is a set of diagrams 100, 120, and 140 that illustrate how a proximity of a tracking device to defined safe devices automatically adjusts the settings of the tracking device in accordance with the inventive arrangements disclosed herein. Safe devices can include stationary and/or moving anchor beacons as well as specific mobile devices designated by a user.

Diagram 100 begins with example area 101 that defines the initial positions and settings of its components. Example area 101 can include a safe region 102 that can be created by an anchor beacon 105. The size of the safe region 102 can be governed by the beacon range 106 and quality of a broadcast signal received by a tracking device. It should be appreciated that the size of the safe region 102 can vary in shape and size depending upon the number of anchor beacons 105 that are used to define the safe region 102, the type of broadcast signal output by the anchor beacon 105, and the presence of objects that block the anchor beacon's 105 signal within the safe region 102. A user can adjust a power setting of the anchor beacon 105 to adjust the range 106 and size of safe region 102 as well as one or more antenna orientations. Further, a user can establish a signal quality threshold that defines a designated range of permitted movement for the tracking device. Changing this threshold can change a permitted range from the anchor beacon. In diagrams 110, 120, and 140, it is assumed that the tracking device is set at a designated range, which is used to define the safe region 102.

An owner 103 and their pet 110 can be located within the safe region 102. Owner 103 can possess a mobile device 104. The pet 110 can wear a tracking collar 112 that contains a power conserving tracking device. While the pet 110 is within the safe region 102, the tracking collar 112 can operate under the shown tracking settings 113. These tracking settings 113 illustrate that the tracking collar 112 can function in a low power mode when near an anchor beacon 105 and that owner notifications are unnecessary in this situation.

However, should the pet 110 leave the safe region 102, as shown in example area 115, changes to the original tracking settings 113 can occur, resulting in a new set of tracking settings 114. This new set of tracking settings 114 can include a change in the power mode of the tracking collar 112 due to the activation of its wide area communications component, such as a WAN transceiver. Additionally, the new tracking settings can trigger the generation of a notification that can be sent to one or more designated devices. In this example, the owner 103 can receive the notification stating that the object has left the safe region 102 on their mobile device 104.

In diagram 120, the owner 103 can be walking their pet 110 outside of the safe region 102. The owner 103 can be in possession of their mobile device 104 while on the walk and this mobile device 104 can be designated as a safe device. Designation of the mobile device 104 as a safe device can result in it having associated tracking settings 125. As shown in this example, the tracking settings 125 can indicate that an active tracking mode and wide area communications have been activated for the tracking device (collar 112), and that notifications are unnecessary. This is similar to the change in settings illustrated in diagram 100, where the tracking collar 112 can no longer remain in the low power mode.

When the pet 110 is proximate to the safe device, a notification to the owner 103 that their pet 110 is outside of the safe region 102 is unnecessary, due to the pet's 110 proximity to the mobile device 104. In the active tracking mode, a tracking server 130 can receive location signals 127 and 128 from the mobile device 104 and tracking collar 112, respectively. With the locational information contained within the location signals 127 and 128, the tracking server 130 can determine the proximity of the tracking device (collar 112) to a safe device (mobile device 104) and the anchor beacon 105. The tracking server 130 can then use these determined distances to check against a user-defined tracking profile 135.

As shown in this example, the tracking profile 135 can contain preset conditions and corresponding allowed safe distances. Since the tracking device (collar 112) meets the condition for the safe device (mobile device 104) and both devices are within the distance allowed from the anchor beacon 105, the tracking server 130 can determine that the pet 110 is intentionally outside of the safe region 102 and that this is not a cause for alarm. Other settings can be established in profile 135 for different devices having different owners. For example, a device 199 can be a mobile telephone carried by a child who is permitted to walk the pet 110 up to two miles from the yard so long as the child stays within forty feet of the pet 110. A different person associated with device 195 can be permitted to travel with the pet 110 up to ten miles from the yard so long as the pet 110 stays within twenty feet of device 395. It can be appreciated that a range of values for the "allowed safe distance" can include zero to infinity and all values in between.

In one embodiment, a special safe power mode can be employed that selectively turns on a WAN transceiver and detection component at a long iteration, such as once every fifteen minutes. This means a location of the pet 110 is conveyed to the tracking server 130 at fifteen minute intervals. If the pet 110 strays too far from the safe device, the tracking collar 112 can be adjusted to an active tracking mode, having a shorter iteration between location transmissions than the safe power mode. For example, the WAN transceiver and detection component can be activated once every five minutes in the active tracking mode, causing a location of the pet 110 to be sent to the server 130 every five minutes. In one configuration, distance transmission iterations can be dynamically shortened to conserve power when the power remaining in the tracking collar 112 is low.

Diagram 140 illustrates a situation similar to diagram 120 where the pet 110 is outside of the sale region 102 with its owner 103 who is carrying a mobile device 145. Unlike diagram 120, however, proximity between an owner 103 and a pet 110 can be based upon a personal area network 150 range. For example, both the mobile device 145 and the tracking collar 112 can be BLUETOOTH enabled devices, which are automatically aware of one another when within BLUETOOTH range. Broadcasts from the collar 112 to a tracking server 155 can occur only when the collar 112 is outside of the safe region 102 and outside of the BLUETOOTH range of device 145. The BLUETOOTH range is indicated by the dashed line labeled personal area network (PAN) 150. Appreciably, diagram 140 shows a configuration that permits the collar 112 to selectively remain in low power mode, even when outside of the safe region 102.

Communications that authorize the mobile device 145 as a safe device can occur between device 145 and a remotely located device 155, which can be a server hosting the tracking profile 160. The device 155 can send an authorization key to device 145, which is conveyed to the collar 112 via the PAN 150. When the authorization key is valid, the collar 112 can remain in a low power mode. In one embodiment, the authorization key can automatically time-out, which allows the computing device 155 to account for profile parameters, such as distance from safe region 102. For example, the authorization key can expire every half hour, requiring a new updated key be requested 152. A new key can be conveyed within a response 154, when the mobile device 145 is located an allowed distance from region 102. When outside of this distance, no key will be sent in response 154 which causes collar 112 to shift from a low-power mode to an active tracking mode, which in turn results in a notice (not shown) being sent.

Figure 2:
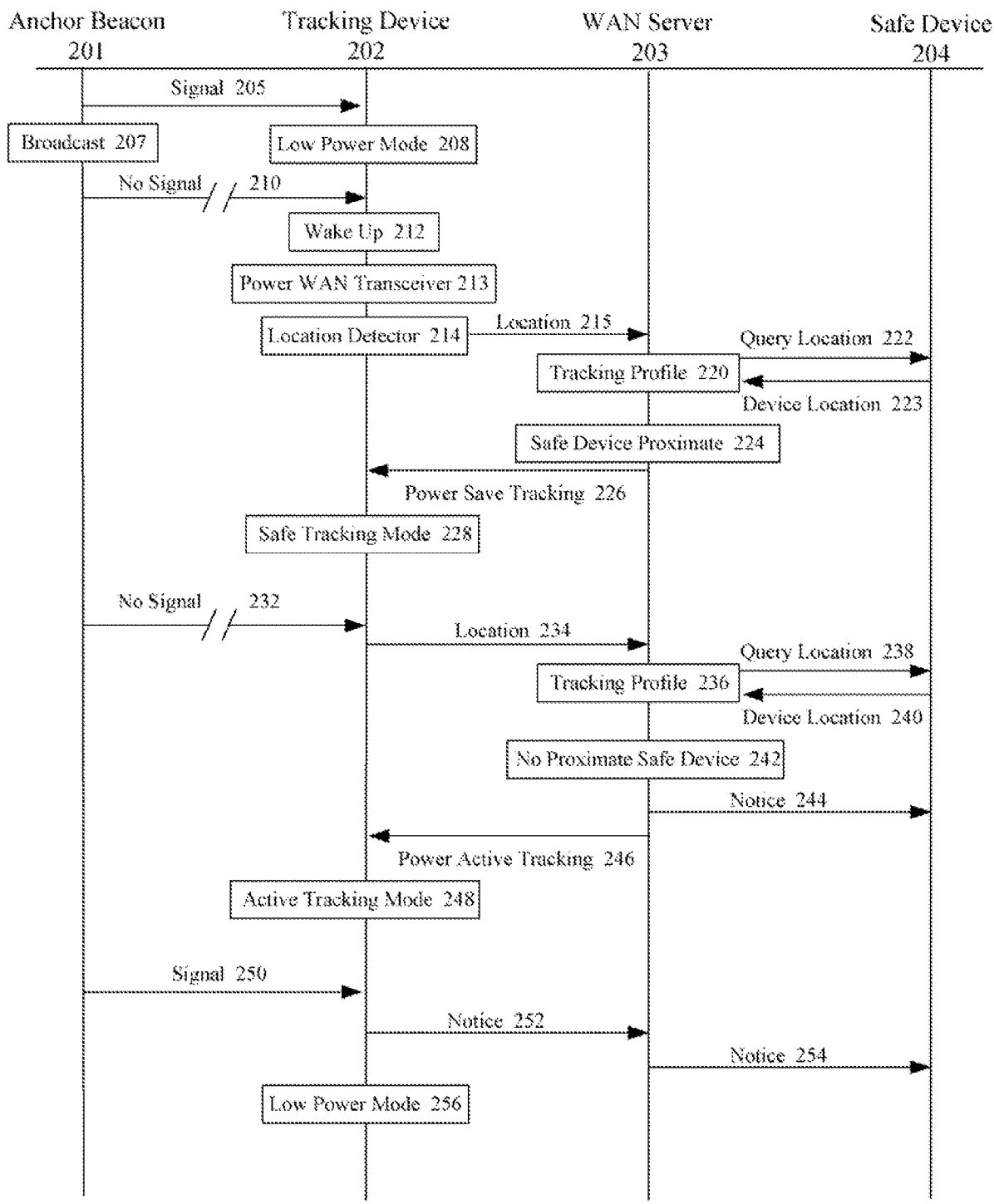
FIG. 2 is a graphical representation illustrating the basic interactions between components automatically adjusting the settings of a tracking device in accordance with an embodiment of the inventive arrangements disclosed herein.

FIG. 2 is a graphical representation 200 illustrating the basic interactions between components automatically adjusting the settings of a tracking device in accordance with an embodiment of the inventive arrangements disclosed herein. These interactions can occur between the following components: anchor beacon 201, tracking device 202, WAN server 203, and safe device 204.

Interaction can begin when the tracking device 202 receives signal 205 from the anchor beacon 201. Since the tracking device 202 can receive the signal 205 broadcast 207 from the anchor beacon 201, it can be determined that, the tracking device 202 is within the designed range defined by the signal broadcast from the anchor beacon 201. Therefore, the tracking device 202 can be placed in a low power mode 208. A signal quality threshold can be used to define the designated range, which can be specific to the tracking device 202. That is, a different tracking device (not shown) having a different signal quality threshold will be permitted to be a different designated range from the beacon 201. Since the anchor beacon 201 defines the designated range, it can be set in a state of constant broadcast 207.

Should the tracking device 202 not receive the signal from the anchor beacon 201 or if the quality of the signal is less than a signal quality threshold associated with the device 202, denoted by the broken no signal arrow 210, then it can be determined that the tracking device 201 has left the designated range defined by the anchor beacon 201. At this point, the tracking device 202 can be automatically taken out of the low power mode 208 through the execution of a wake up process 212. The wake up process 212 can activate the WAN transceiver 213 and location detector 214. Activation of these components can increase the power consumption of tracking device 202.

The location detector 214 can then determine the location of the tracking device 202 and send its location 215 to the WAN server 203. Upon receipt of this information, the WAN server 203 can access the tracking profile 220 associated with the tracking device 202. The contents of the tracking profile 220 can resemble the information illustrated in the tracking profile 135 of FIG. 1.

In order to determine what action defined in the tracking profile 220 is necessary, the WAN server 203 can attempt, to determine the proximity of the tracking device 202 to a safe device 204, it should be appreciated that this step should be performed for each safe device 204 defined within the tracking profile 220. In order to make this determination, the WAN server 203 can query the location 222 of the safe device 204. The safe device 204 can respond to this query with its locational information 223.

Now that the WAN server 203 has the location of the tracking device 202 and the safe device 204, it can be determined if the tracking device 202 is within the defined distance of the safe device 204. Step 224 shows that the safe device is proximate, which results in a power saving tracking command 226 being sent to the tracking device 202. This command 226 causes device 202 to enter a safe tracking mode 228. In the safe tracking mode location information can be conveyed over a WAN at a long interval.

After the long interval, the tracking device 202 can determine that no beacon signal 232 is broadcasting a signal having a quality greater than an established signal quality threshold. This causes a location 234 of the device 202 to be conveyed to WAN server 203. The server can again query the profile 236 for safe devices. Device 204 can be queried 238 for a location, which is provided in response 240. The WAN server 203 can determine 242 that the safe device 204 is now no longer proximate to the tracking device 202.

This first causes a notice 244 to be sent to safe device 204. It should be appreciated that the WAN server 203 can send the notice 244 to any receptive device designated by a user and that sending the notice 244 to the safe device 204 is merely an illustration of a possible configuration. Additionally, a power active tracking command 246 is to be issued from the server 203 to the tracking device 202. This command 246 can cause device 202 to be adjusted from safe tracking mode to an active tracking mode 248. The active tracking mode 248 can have a shorter interval for conveying current location information to server 203.

After this short duration, the tracking device 202 can check for a signal 250 from an anchor beacon 201, which is present and which has a quality greater than the established signal quality threshold. This means that the device 202 is now in a safe region. A notice 252 to this effect can be sent to the WAN server 203, which can send a similar notice 254 to the sale device 204, so the owner or guardian is no longer worried about the object associated with the tracking device 202. The tracking device 202 can shift back from the active tracking mode to the low power mode 256.

Figure 3:
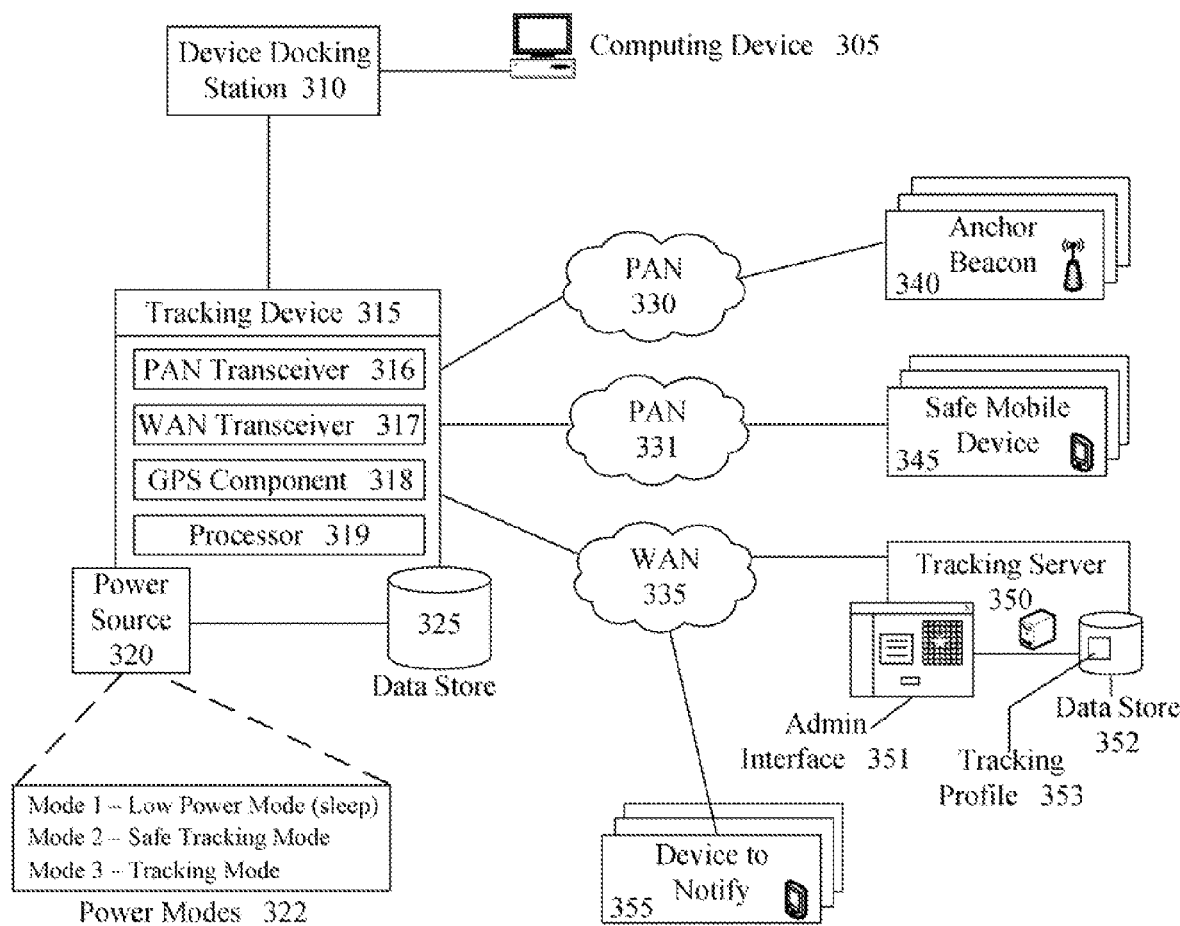
FIG. 3 is a schematic diagram of a system that conserves the power of a tracking device in accordance with an embodiment of the inventive arrangements disclosed herein.

FIG. 3 is a schematic diagram of a system 300 that conserves the power of a tracking device in accordance with an embodiment of the inventive arrangements disclosed herein. System 300 can include a tracking device 315 that can be placed within an optional docking station 310 connected to a computing device 305. The tracking device 315 can be attached to the docking station 310 in a variety of ways, such a wirelessly through a BLUETOOTH connection or physically with a Universal Serial Bus (USB) cable. When attached to the docking station 310, the tracking device 315 can recharge its power source 320 and exchange information with the computing device 305. Computing device 305 can provide the tracking device 315 with configuration data.

The tracking device 315 can include additional components such as a PAN transceiver 316, a WAN transceiver 317, a GPS component 318, a processor 319, a power source 320, and a data store 325. It should be appreciated that the processor 319 and data store 325 are required to conduct the automated adjustment of power and communication components. The data store 325 can store device specific information, such as a signal quality threshold that is used to define a designated range that the device is allowed to be from an anchor beacon 340.

The PAN transceiver 316 can receive signals broadcast from the anchor beacon 340 over PAN 330. The PAN transceiver 316 can also communicate with one or more safe mobile devices over PAN 331. In one embodiment, different PAN transceivers 316 can be required for PAN 330 and 331. For example. PAN 330 can be a 802.11 based wireless network (WIFI) and PAN 331 can be a BLUETOOTH based network.

The WAN transceiver 317 can communicate its locational information to the tracking server 350 via WAN 335. Over the WAN 335, the tracking server 350 can send the tracking device 315 instructions as well as send notifications to a designated device to notify 355. In an alternate embodiment, the device to notify 355 can be a sale mobile device 345.

The tracking server 350 can include an administration interface 351 and a data store 352. The tracking profile 353 for the tracking device 315 can be contained within this data store 352. A user can use the administration interface 351 to configure the tracking profile 353 for the tracking device 315. This can include designating a safe mobile device 345, an allowed distance from an anchor beacon 340, and a device to notify 355. A user can access the administration interface 351 via computing device 305. For example, a user could access the interlace over the Internet from a mobile telephone.

The power source 320 of the tracking device 315 can include power modes 322. As shown in this example, the power source 320 supports three power modes 322. The low power mode can be analogous to a sleep mode and can be invoked when the tracking device 315 is within the safe region. The tracking mode can be analogous to a full power mode and can be invoked when the tracking device 315 is outside of the safe region and not proximate to a safe device; the system 300 is actively trying to locate the object. Should the tracking device be proximate to a safe mobile device 345, the safe tracking mode can be invoked, which consumes less power than the active tracking mode.

As used herein, presented data stores, including stores 325 and 352, can be a physical or virtual storage space configured to store digital information. Data stores 325 and 352 can be physically implemented within any type of hardware including, but not limited to, a magnetic disk, an optical disk, a semiconductor memory, a digitally encoded plastic memory; a holographic memory, or any other recording medium. Each of the data stores 325 and 352 can be a stand-alone storage unit as well as a storage unit, formed from a plurality of physical devices. Additionally, information can be stored within data stores 325 and 352 in a variety of manners, for example, information can be stored within a database structure or can be stored within one or more files of a file storage system, where each file may or may not be indexed for information searching purposes. Further, data stores 325 and/or 352 can utilize one or more encryption mechanisms to protect stored information from unauthorized access.

WAN 335 can include any hardware/software/and firmware necessary to convey data encoded within carrier waves. Data can be contained within analog or digital signals and conveyed though data or voice channels, WAN 335 can include local components and data pathways necessary for communications to be exchanged among computing device components and between integrated device components and peripheral devices. WAN 335 can also include network equipment, such as routers, data lines, hubs, and intermediary servers which together form a data network, such as the Internet. WAN 335 can also include circuit-based communication components and mobile communication components, such as telephony switches, modems, cellular communication towers, and the like. WAN 335 can include line based and/or wireless communication pathways.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing form the spirit or essential attributes thereof. Accordingly, reference should be made to the following claims, rather than to the foregoing specification, as indicating the scope of the invention.

What is claimed is:

1. A power conserving tracking system comprising:
at least one anchor beacon configured to broadcast a signal;
a tracking device configured to determine a location of the tracking device using a location detector, said tracking device also comprising a beacon sensor configured to detect the signal broadcast by the beacon, a wireless transceiver configured to wireless exchange messages with a remotely located tracking server, and a power source, the tracking device also has a plurality of power modes, said power modes including at least a low power mode and a high power mode, wherein said low power mode is automatically utilized when the tracking device is within a designated range of at least one anchor beacon, and wherein said high power mode is automatically utilized when the tracking device is outside the designated range.

2. The system of claim 1, wherein when the tracking device is operating in low power mode, the location detector and the wireless transceiver are placed in a sleep state, and wherein when operating in high power mode, the location detector and the wireless transceiver are placed in an active state.

3. The system of claim 1, wherein when operating in the high power mode the tracking device repetitively transmits messages specifying a location of the tracking device to the tracking server, and wherein when operating in low power mode a lesser frequency of transmitted messages are conveyed from the tracking device to the tracking server.

4. The system of claim 3, wherein when operating in the low power mode, no transmitted messages are conveyed from the tracking device to the tracking server.

5. The system of claim 3, wherein the plurality of power modes further comprises a medium power mode, wherein when operating in the medium power mode the tracking device transmits messages specifying a location of the tracking device to the tracking server with a frequency less than a frequency associated with the high power mode and greater than a frequency associated with a low power mode, wherein the medium power mode is automatically utilized when the tracking device is outside the designated range but within a geo fence, and wherein the high power mode is automatically utilized when the tracking device is outside the designated range but outside the geo fence.

6. The system of claim 5, wherein the tracking server is configured to convey commands to the tracking device, which cause the tracking device to change operational power modes in accordance with the commands.

7. The system of claim 5, wherein the geo fence is defined by a location of a mobile device, which is registered with and tracked by the tracking server.

8. The system of claim 1, wherein the tracking server is configured to receive messages from the tracking device and to automatically convey notification messages to a monitoring computing device to inform a user associated with the monitoring computing device whenever the tracking device is located outside the designated range.

9. The system of claim 1, wherein the wireless transceiver is a wide area network (WAN) transceiver that directly connects the tracking device to the tracking server.

10. The system of claim 1, wherein the wireless transceiver is a personal area network (PAN) transceiver that connects to an intermediary computing device, where the intermediary computing device is connected to the tracking server via a wide area network (WAN) connection.

11. A method to track an object comprising:
automatically sensing whether a tracking device is within a designated broadcast range of at least one anchor beacon;
when outside of the designated range, changing a power state of the tracking device to activate an included wide area network transceiver and an included location detector;
when the power state is changed, determining a location of the tracking device using the location detector; and
wirelessly conveying a notification to a predetermined computing device, said notification including the determined location.

12. The method of claim 11, further comprising:
while outside of the designated range, iteratively repeating the determining and the conveying steps.

13. The method of claim 11, wherein the tracking device includes a signal quality threshold, which defines the designated range.

14. The method of claim 11, further comprising:
detecting a proximity between the tracking device and a previously designated safe device while the device is located outside the designated range; and
decreasing a frequency with which location updates are sent from the tracking device to the tracking server based upon the detected proximity.

15. A method for tracking objects in a power conservative fashion comprising:
establishing a designated range based upon a wireless broadcast emitting from at least one anchor beacon;
automatically placing a tracking device in a low power mode when the tracking device is within the designated range; and
automatically placing the tracking device in an high power mode when the tracking device is outside of the designated range, wherein a wireless transceiver within the tracking device repetitively conveys location identifying messages to a tracking server when operating in the high power mode, and wherein messages are not automatically conveyed from the tracking device to the tracking server when operating in low power mode.

16. The method of claim 15, further comprising:
establishing a geo fence boundary;
automatically placing the tracking device in a medium power mode when the tracking device is outside the designated range but contained within the geofence boundary, wherein the wireless transceiver repetitively conveys location identifying messages to the tracking server when operating in medium power mode with a message conveyance frequency than is less than a message conveyance frequency associated with the high power mode.

17. The method of claim 16, wherein the geo fence boundary is based upon a location of a mobile device, whereby the tracking device operates in medium power mode when proximate to the mobile device and when outside the designated range.

* * * * *